US007002765B2

(12) United States Patent
Lum et al.

(10) Patent No.: US 7,002,765 B2
(45) Date of Patent: Feb. 21, 2006

(54) SMART RETRY OPERATION

(75) Inventors: CheeWai Lum, Singapore (SG); LingLing Chua, Singapore (SG); KokChoon See, Singapore (SG)

(73) Assignee: Seagate Technology, LLC, Scotts Valley, CA (US)

( * ) Notice: Subject to any disclaimer, the term of this patent is extended or adjusted under 35 U.S.C. 154(b) by 76 days.

(21) Appl. No.: 10/387,250

(22) Filed: Mar. 12, 2003

(65) Prior Publication Data

US 2004/0047063 A1 Mar. 11, 2004

Related U.S. Application Data

(60) Provisional application No. 60/409,158, filed on Sep. 9, 2002.

(51) Int. Cl.
*G11B 5/09* (2006.01)

(52) U.S. Cl. ............................ 360/53; 360/46; 360/31; 360/39; 360/77.04; 369/53.1; 369/53.35

(58) Field of Classification Search .................. 360/53, 360/46, 77.04, 31, 39; 369/53.1, 53.35, 30.22; 714/30, 15, 758, 764, 774
See application file for complete search history.

(56) References Cited

U.S. PATENT DOCUMENTS

| | | | | |
|---|---|---|---|---|
| 5,721,816 | A | 2/1998 | Kusbel et al. | |
| 6,084,733 | A * | 7/2000 | Ohzeki et al. | 360/53 |
| 6,122,235 | A * | 9/2000 | Arai | 369/53.35 |
| 6,188,538 | B1 | 2/2001 | Mills et al. | |

* cited by examiner

*Primary Examiner*—David Hudspeth
*Assistant Examiner*—Natalia Figueroa
(74) *Attorney, Agent, or Firm*—Shumaker & Sieffert, P.A.

(57) ABSTRACT

A smart retry operation, or set of retry procedures to be performed in sequence, that optimizes itself for a data storage device's individual characteristics, including variations across the data storage media and variations introduced as the device degrades over time, is disclosed. The data storage media (e.g. a disc in a disc drive) is divided into a number of zones and a separate smart retry operation is maintained for each zone. The data storage media is then tested to find errors correctable by the retry procedures. A statistical likelihood for each retry procedure is developed. The sequential order of the retry procedures in each zone's operation is then optimized based on the statistics. A single read/write retry sequences or separate read and write retry sequences may be maintained. The retry operations may be constantly re-optimized over the lifetime of the data storage device.

5 Claims, 12 Drawing Sheets

200

202 216 212 214

| Retry Procedure Description | ID | Sub-Procedure Description | Retry Time (ms) (Cumulative) |
|---|---|---|---|
| Off Track (204) | 1 | Off-track to +5% | 1 |
| | | Off-track to +10% | 2 |
| | | Off-track to –5% | 3 |
| | | Off-track to -10% | 4 |
| VGA Gain (206) | 2 | Set VGA Gain x2 | 5 |
| | | Set VGA Gain x4 | 6 |
| | | Set VGA Gain x6 | 7 |
| | | Set VGA Gain x8 | 8 |
| FIR (208) | 3 | Set FIR x2 | 9 |
| | | Set FIR x4 | 10 |
| | | Set FIR x6 | 11 |
| | | Set FIR x8 | 12 |
| MR Bias (210) | 4 | Set MR Bias +1 | 13 |
| | | Set MR Bias +2 | 14 |
| | | Set MR Bias -1 | 15 |
| | | Set MR Bias -2 | 16 |

| Zone ID | Retry Procedures | | | |
|---|---|---|---|---|
| | First | Second | Third | Fourth |
| 1 | 2 | 1 | 3 | 4 |
| 2 | 3 | 1 | 2 | 4 |
| 3 | 1 | 3 | 4 | 2 |
| 4 | 4 | 2 | 3 | 1 |
| ⋮ | ⋮ | ⋮ | ⋮ | ⋮ |
| m | 2 | 1 | 3 | 4 |

FIG. 2b

| Retry Procedure Description | Sub-Procedure Description | Time Taken (ms) | Number of Retries per Zone | | | | | Sub Total Retry Time (ms) |
|---|---|---|---|---|---|---|---|---|
| | | | 1 | 2 | 3 | 4 | 5 | |
| Procedure 1 | Off-track to +5% | 1 | 72 | 66 | 96 | 63 | 65 | 362 |
| - Off Track | Off-track to +10% | 2 | 71 | 44 | 68 | 42 | 63 | 576 |
| | Off-track to –5% | 3 | 83 | 45 | 68 | 56 | 77 | 987 |
| | Off-track to -10% | 4 | 85 | 38 | 87 | 52 | 79 | 1364 |
| Procedure 2 | Set VGA Gain x2 | 5 | 25 | 44 | 23 | 31 | 26 | 745 |
| - VGA Gain | Set VGA Gain x4 | 6 | 20 | 59 | 13 | 38 | 14 | 864 |
| | Set VGA Gain x6 | 7 | 30 | 39 | 25 | 48 | 11 | 1071 |
| | Set VGA Gain x8 | 8 | 26 | 51 | 20 | 52 | 16 | 1320 |
| Procedure 3 - FIR | Set FIR x2 | 9 | 47 | 69 | 36 | 88 | 72 | 2808 |
| | Set FIR x4 | 10 | 48 | 86 | 70 | 76 | 86 | 3660 |
| | Set FIR x6 | 11 | 37 | 93 | 41 | 93 | 94 | 3938 |
| | Set FIR x8 | 12 | 40 | 91 | 42 | 90 | 81 | 4128 |
| Procedure 4 | Set MR Bias +1 | 13 | 37 | 27 | 38 | 24 | 15 | 1833 |
| - MR Bias | Set MR Bias +2 | 14 | 48 | 21 | 45 | 21 | 23 | 2212 |
| | Set MR Bias -1 | 15 | 53 | 23 | 41 | 29 | 18 | 2460 |
| | Set MR Bias -2 | 16 | 38 | 17 | 50 | 12 | 11 | 2048 |

Total Retries Time (ms) 30376

FIG. 5

| Retry Procedure Description | Sub-Procedure Description | Time Taken (ms) | Number of Retries | Sub Total Retry Time (ms) |
|---|---|---|---|---|
| Off-Track | Off-track to +5% | 1 | 72 | 72 |
| | Off-track to +10% | 2 | 71 | 142 |
| | Off-track to –5% | 3 | 83 | 249 |
| | Off-track to -10% | 4 | 85 | 340 |
| MR Bias | Set MR Bias +1 | 5 | 37 | 185 |
| | Set MR Bias +2 | 6 | 48 | 288 |
| | Set MR Bias -1 | 7 | 53 | 371 |
| | Set MR Bias -2 | 8 | 38 | 304 |
| FIR | Set FIR x2 | 9 | 47 | 423 |
| | Set FIR x4 | 10 | 48 | 480 |
| | Set FIR x6 | 11 | 37 | 407 |
| | Set FIR x8 | 12 | 40 | 480 |
| VGA Gain | Set VGA Gain x2 | 13 | 25 | 325 |
| | Set VGA Gain x4 | 14 | 20 | 280 |
| | Set VGA Gain x6 | 15 | 30 | 450 |
| | Set VGA Gain x8 | 16 | 26 | 416 |

Total Zone 1 Retries Time (ms) 5212

FIG. 6a

| Retry Procedure Description | Sub-Procedure Description | Time Taken (ms) | Number of Retries | Sub Total Retry Time (ms) |
|---|---|---|---|---|
| FIR | Set FIR x2 | 1 | 69 | 69 |
| | Set FIR x4 | 2 | 86 | 172 |
| | Set FIR x6 | 3 | 93 | 279 |
| | Set FIR x8 | 4 | 91 | 364 |
| Off Track | Off-track to +5% | 5 | 66 | 330 |
| | Off-track to +10% | 6 | 44 | 264 |
| | Off-track to −5% | 7 | 45 | 315 |
| | Off-track to -10% | 8 | 38 | 304 |
| VGA Gain | Set VGA Gain x2 | 9 | 44 | 396 |
| | Set VGA Gain x4 | 10 | 59 | 590 |
| | Set VGA Gain x6 | 11 | 39 | 429 |
| | Set VGA Gain x8 | 12 | 51 | 612 |
| MR Bias | Set MR Bias +1 | 13 | 27 | 351 |
| | Set MR Bias +2 | 14 | 21 | 294 |
| | Set MR Bias -1 | 15 | 23 | 345 |
| | Set MR Bias -2 | 16 | 17 | 272 |

Total Zone 2 Retries Time (ms) 5386

FIG. 6b

| Retry Procedure Description | Sub-Procedure Description | Time Taken (ms) | Number of Retries | Sub Total Retry Time (ms) |
|---|---|---|---|---|
| Off Track | Off-track to +5% | 1 | 96 | 96 |
| | Off-track to +10% | 2 | 68 | 136 |
| | Off-track to –5% | 3 | 68 | 204 |
| | Off-track to -10% | 4 | 87 | 348 |
| FIR | Set FIR x2 | 5 | 36 | 180 |
| | Set FIR x4 | 6 | 70 | 420 |
| | Set FIR x6 | 7 | 41 | 287 |
| | Set FIR x8 | 8 | 42 | 336 |
| MR Bias | Set MR Bias +1 | 9 | 38 | 342 |
| | Set MR Bias +2 | 10 | 45 | 450 |
| | Set MR Bias -1 | 11 | 41 | 451 |
| | Set MR Bias -2 | 12 | 50 | 600 |
| VGA Gain | Set VGA Gain x2 | 13 | 23 | 299 |
| | Set VGA Gain x4 | 14 | 13 | 182 |
| | Set VGA Gain x6 | 15 | 25 | 375 |
| | Set VGA Gain x8 | 16 | 20 | 320 |

Total Zone 3 Retries Time (ms) 5026

FIG. 6c

| Retry Procedure Description | Sub-Procedure Description | Time Taken (ms) | Number of Retries | Sub Total Retry Time (ms) |
|---|---|---|---|---|
| FIR | Set FIR x2 | 1 | 88 | 88 |
| | Set FIR x4 | 2 | 76 | 152 |
| | Set FIR x6 | 3 | 93 | 279 |
| | Set FIR x8 | 4 | 90 | 360 |
| Off Track | Off-track to +5% | 5 | 63 | 315 |
| | Off-track to +10% | 6 | 42 | 252 |
| | Off-track to –5% | 7 | 56 | 392 |
| | Off-track to -10% | 8 | 52 | 416 |
| VGA Gain | Set VGA Gain x2 | 9 | 31 | 279 |
| | Set VGA Gain x4 | 10 | 38 | 380 |
| | Set VGA Gain x6 | 11 | 48 | 528 |
| | Set VGA Gain x8 | 12 | 52 | 624 |
| MR Bias | Set MR Bias +1 | 13 | 24 | 312 |
| | Set MR Bias +2 | 14 | 21 | 294 |
| | Set MR Bias -1 | 15 | 29 | 435 |
| | Set MR Bias -2 | 16 | 12 | 192 |

Total Zone 4 Retries Time (ms) 5298

FIG. 6d

| Retry Procedure Description | Sub-Procedure Description | Time Taken (ms) | Number of Retries | Sub Total Retry Time (ms) |
|---|---|---|---|---|
| FIR | Set FIR x2 | 1 | 72 | 72 |
| | Set FIR x4 | 2 | 86 | 172 |
| | Set FIR x6 | 3 | 94 | 282 |
| | Set FIR x8 | 4 | 81 | 324 |
| Off Track | Off-track to +5% | 5 | 65 | 325 |
| | Off-track to +10% | 6 | 63 | 378 |
| | Off-track to –5% | 7 | 77 | 539 |
| | Off-track to -10% | 8 | 79 | 632 |
| VGA Gain | Set VGA Gain x2 | 9 | 26 | 234 |
| | Set VGA Gain x4 | 10 | 14 | 140 |
| | Set VGA Gain x6 | 11 | 11 | 121 |
| | Set VGA Gain x8 | 12 | 16 | 192 |
| MR Bias | Set MR Bias +1 | 13 | 15 | 195 |
| | Set MR Bias +2 | 14 | 23 | 322 |
| | Set MR Bias -1 | 15 | 18 | 270 |
| | Set MR Bias -2 | 16 | 11 | 176 |
| | | | | |
| | | | | |
| | | Total Zone 5 Retries Time (ms) | | 4374 |

FIG. 6e

| | Zone | Total Zone Retries Time |
|---|---|---|
| | 1 | 5212 |
| | 2 | 5386 |
| | 3 | 5026 |
| | 4 | 5298 |
| | 5 | 4374 |
| | | |
| Total Retries Time for Disc (ms) | | 25296 |

FIG. 7

SMART RETRY OPERATION

RELATED APPLICATIONS

This application claims priority of U.S. provisional application Ser. No. 60/409,158, filed Sep. 9, 2002.

FIELD OF THE INVENTION

This application relates generally to the operation of data storage devices and more particularly to reducing the retry time needed to correct read and write errors.

BACKGROUND OF THE INVENTION

Data storage devices, such as those that utilize disc-shaped data storage media like disc drives, record data in tracks on the data storage media and also read recorded data from the tracks. Devices do this by positioning a read/write head with a signal transducer over a track so that data can be written to or read from the track. Errors in reading or writing data can occur due to problems positioning the head or irregularities in the track and storage media. When an error occurs as data is written to or read from a track, a retry operation typically is performed in an attempt to correct the error. Retry operations often include a variety of retry procedures, also sometimes referred to as error recovery routines, each designed to correct for a different error type. If the retry operation is unsuccessful, i.e. none of the retry procedures were able to correct the error, the device interprets this as a "hard" error and considers that location on the track no longer usable.

On a data storage media a read error may occur due to various causes, such as scratches on the media, asperity (or roughness) of the storage media surface, and non-homogeneity in data storage material over the media. Read errors may also occur due to track "wander" wherein the track does not follow the expected path. Errors at different locations on the data storage media may be caused different things and, thus, require different retry procedures to correct. Additionally, errors may change over time. Errors may be introduced over time as the data storage media deteriorates with use and age or is damaged. Although rare, errors may also ameliorate over time as well.

Various retry procedures have been invented to correct for many of the errors encountered. These may include changing the gain of a reading or writing circuit, looking for data in the vicinity of where the track was expected to be found (off-track checking), and changing the bias value of a magneto resistance (MR) element in the case where the MR element is used as a read head. For example, in a disc drive with a magnetic disc and a hard-disc controller, the retry procedures may be, for example, varying an off-track quantity which is an offset quantity between the center of the magnetic head and the center of the track, varying a bias current value given to an MR element in the case where a magnetic head is equipped with the MR element, or various automatic gain control factors such as the gain of the variable gain amplifier (VGA) and the adaption rate of the finite impulse response (FIR) filter. Retry procedures also often include a number of subprocedures, comprising incrementally increasing some deviation from a normal read or write operation parameter such as location or bias.

The retry operation typically performs its retry procedures in sequence until the error is corrected or the procedures are exhausted and a hard error is determined. Depending on what type or error is at a location, the retry operation may take more or less time in correcting it because of where in the retry procedure sequence the appropriate retry procedure occurs. For example, an error may be track wander error, which will be corrected by the off-track retry procedure. If the off-track retry procedure is the first retry procedure in the retry procedure sequence, then the error will be corrected relatively quickly. However, if the off-track procedure is the last in the sequence, the retry operation—while still successful—will take a relatively longer time. Since the overall rate that data can be read and written is an important performance parameter for data storage devices, there is a need to minimize the amount of time a data storage devices spends performing retry operations.

Typical retry operations are standardized according the data storage device's characteristics at the design stage. The procedures and subprocedures of the operation are selected and ordered based on certification testing of a predefined population of the product prototype. The ordering of the procedures is made by sorting the retry procedures in the operation sequentially by probability of success, with the most probable retry procedure made the first procedure in the operation. While not optimum for every error on the tested media, when looking at the media as a whole, the sequence is optimized over the media as a whole, resulting in an optimized average time the device spends performing retry operations. The resulting standardized retry operation is stored in every device and is used without modification throughout the lifetime of the device. Whenever an error is detected that requires a retry, the retry operation starts with the first retry procedure and proceeds sequentially through its subprocedures. Then it proceeds to the second procedure and so on through all the procedures and subprocedures. If at any time a retry subprocedure is successful, then the retry operation is terminated. The implementation of the operation is simple and relatively fast, both during manufacture and operation. The standardized retry operation, however, does not take into account any individual variation among devices or the degradation of the device over time. For that reason, it is not very efficient at reducing the time a device spends performing retries.

Because the retry operation affects the average read and write speed of the device, there is a general need to minimize the average time a device spends performing retry operations. In addition, there is also a need to adjust the sequence as the device degrades over time and maintain the optimal sequence.

Accordingly there is a need for a smart method for performing retry operations that re-optimizes itself by adjusting to variations in errors over time and location in the storage media. The present invention provides a solution to this and other problems, and offers other advantages over the prior art.

SUMMARY OF THE INVENTION

Against this backdrop the present invention has been developed. An embodiment of the present invention is a smart retry method, or sequence for performing retry procedures, that optimizes itself for the data storage device's individual characteristics, including variations across the data storage media and variations introduced as the device degrades over time. In embodiments, the data storage media (e.g. a disc in a disc drive) is divided into a number of zones and a separate sequence of retry procedures is maintained for each zone. The data storage media is tested to find errors correctable by the retry procedures and to determine the number of successful retries in each zone for each procedure. From this information, a statistical likelihood of success for each retry procedure is developed. The sequential order of the retry procedures in each zone's sequence is then optimized based on the statistics by placing the most statistically likely retry procedure as the first procedure in the sequence, the second-most likely retry procedure as the second procedure in the sequence, and so on. In this way, a retry operation for each zone is optimized, thus reducing the average time spent performing retries in each zone and, consequently, in the storage media overall.

One retry sequence for each zone may be used for both write and read retry operations. Alternatively, separate read and write retry sequences may be maintained and used for each zone. Using separate sequences results in improved performance as the optimum write retry sequences may not mirror the optimum read retry sequences for the same zone. In fact, they need not even contain the same set of retry procedures.

The retry sequences may be periodically re-optimized over the lifetime of the data storage device. This allows the retry sequences to change in response to changes in each zone's characteristics over time. Updated data for successful read retry procedures may be obtained during the device's self-diagnostic routines typically run during idle periods. The retry data may then be statistically analyzed as described above and used to reorder the procedures in the sequence(s) for the zone or zones investigated during the self-diagnostic. Updated write retry data may be obtained during user-initiated security operations which cause a write command to be issued to every sector in a zone or zone(s).

These and various other features as well as advantages which characterize the present invention will be apparent from a reading of the following detailed description and a review of the associated drawings.

BRIEF DESCRIPTION OF THE DRAWINGS

FIG. 2 is an exemplary sequence of four retry procedures in accordance with an embodiment of the present invention.

FIG. 5 presents the typical performance of the exemplary retry operation for a data storage device without the benefit of the present invention.

FIG. 6*a* shows the improved performance for zone 1 of the data storage device as shown in FIG. 5 practicing an embodiment of the present invention.

FIG. 6*b* shows the improved performance for zone 2 of the data storage device as shown in FIG. 5 practicing an embodiment of the present invention.

FIG. 6*c* shows the improved performance for zone 3 of the data storage device as shown in FIG. 5 practicing an embodiment of the present invention.

FIG. 6*d* shows the improved performance for zone 4 of the data storage device as shown in FIG. 5 practicing an embodiment of the present invention.

FIG. 6*e* shows the improved performance for zone 5 of the data storage device as shown in FIG. 5 practicing an embodiment of the present invention.

FIG. 7 shows the overall improved performance for the device shown in FIGS. 5*a* through 5*e*.

DETAILED DESCRIPTION

Figure 1:
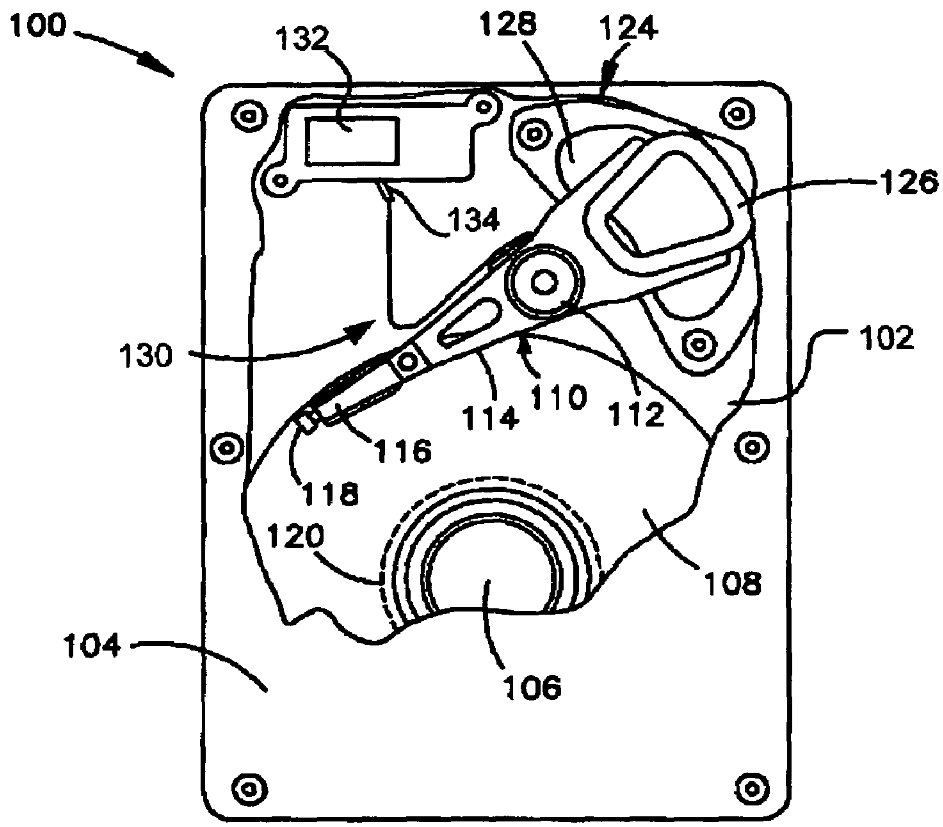
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes a fluid bearing slider, enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2*a*, shown therein in tabular form is an exemplary set 200 of four retry procedures 202 to be used by a retry operation. The first procedure in the set 200 is the track offset procedure 204 called "Off-Track" wherein the head is offset from the original position to attempt to correct for track misregistration. The second procedure is the variable gain amplifier (VGA) gain procedure 206 wherein the VGA gain is increased to attempt to compensate for faint signals. The third procedure in the table is the finite impulse response (FIR) procedure 208. The fourth procedure is the magneto resistance (MR) Bias procedure 210, which was discussed in the background. Note that in the exemplary operation, each procedure 202 is shown as having 4 sub-procedures 212 representing variations in the amount of correction applied during each procedure. It will be clear to one skilled in the art this is exemplary and that any number of procedures 202 having any number of subprocedures 212 may be utilized and still remain within the scope of the invention.

One skilled in the art will also realize that the sequence in which retry procedures are performed need not be determined by their position on a table. In the embodiment shown, for example, the retry procedures are identified by retry procedure identification (ID) numbers 216 and the sequence may be stored separately as a sequential list of ID numbers 216. The sequence may be easily reordered by changing the order the ID numbers appear in the sequence. This has the benefit that if more than one sequence is used by the device, only one set of retry procedures need be stored, rather than multiple tabular sets. Many other methods for providing a sequence of retry procedures will be readily apparent to those skilled in the art and could be utilized while not departing from the scope of the invention.

In practice, executing the retry procedures of FIG. 2*a* will require a finite amount of time. The time will depend on the responsiveness of the head positioning electronics as well as what retry procedure 202 and sub-procedure 212, if any, is successful in correcting the error. For the purposes of providing a hypothetical example of the effectiveness of the invention, it shall be assumed that each subprocedure shall take 1 millisecond (ms) to perform. Thus, if the set 200 of retry procedures 202 were performed in the order in which they appear in the table, the total time it would take to execute all the procedures in the operation is 16 ms. The time required for the retry operation to perform any particular subprocedure, referred to as the Retry Time 214, is shown in the third column of the table. Note that, because of the sequential nature of the retry operation, the Retry Time 214 for any particular subprocedure 212 includes the time it takes to perform all the preceding subprocedures 212 in the sequence. In typical data storage devices not practicing the present, the set 200 would be the entire retry operation wherein the sequence the retry procedures appear in the table is the sequence used for the entire data storage media.

A smart retry operation in accordance with an embodiment of the present invention optimizes itself for the specific data storage device's individual characteristics, including variations across the storage media and variations introduced as the device degrades over time. In an exemplary embodiment, the data storage media (e.g. a disc in a disc drive) is divided into a number of zones and a separate sequence is maintained for each zone. This allows each zone's sequence to be tailored to the particular characteristic of the errors that predominate that zone. The more zones that are used, the better the method will optimize (i.e. reduce) the overall time the device spends performing retry procedures. Furthermore, over the lifetime of the data storage device, the sequence is constantly re-optimized, which allows the retry operation to adapt to changes in each zone's characteristics over time.

Turning now to FIG. 2*b*, for a data storage media divided into m number of zones and the data storage device having the four retry procedures as shown in FIG. 2*a*, one embodiment of the m sequences 220 are shown. Each sequence 220 contains a zone identifier 222 and a sequential list of retry procedure ID numbers 216. For example, as shown in FIG. 2*a* the sequence 220 of retry procedure ID numbers 216 for zone 2 is 3-1-2-4. Thus, for zone 2, a retry operation would perform FIR procedure 208 first, the Off-Track procedure 204 second, the VGA Gain procedure 206 third and the MR Bias procedure 210 last.

Preferably, the sequences 220 are initially optimized during device manufacture. To do this, the retry statistics of each zone of a device may be determined by factory testing. After the data storage media has been divided into zones, the factory test writes and reads over all the tracks in the data storage media and records the number times of each sub-procedure was successful at correcting an error in each zone. Then the sequence 220 of retry procedures 202 for each zone are ordered by success probability, with the most successful procedure ordered as the first procedure 224 in the sequence. The sequences 220 may vary by zone depending on the retry statistics found in the zone. In one embodiment of the present invention, the read retry statistics and write retry statistics are preferably combined and one read/write sequence 220 for each zone is determined. In another embodiment, two different and independent sequences 220 are provided for each zone: a read retry sequence and a write retry sequence. In each case, the sequences 220 created are then stored in the device for subsequent use during operation.

The sequences 220 and retry procedures 202 for a device may be stored on reserved sectors of the data storage media, or may be stored in memory in the data storage device. They may also be stored in compressed form to save storage space. Upon startup, the device may retrieve some or all of the retry procedures 202 and sequences 220 load them into fast memory to improve the speed at which the retry operation may be performed.

Figure 3:
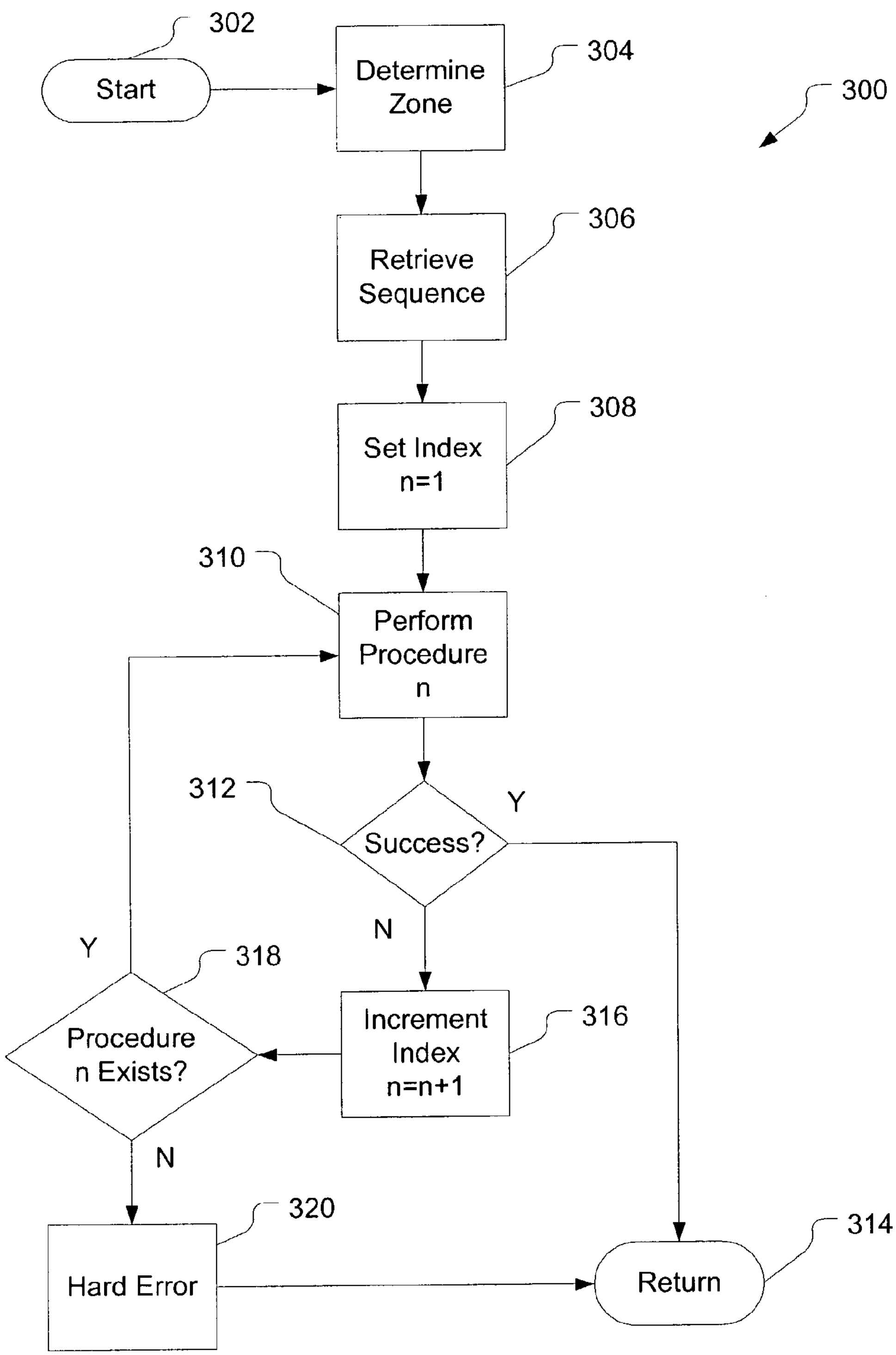
FIG. 3 is a flow chart of a method of performing a retry operation in accordance with an embodiment of the present invention.

Turning now to FIG. 3, a method 300 for performing a retry operation in accordance with one embodiment of the present invention is shown. The method begins when the data storage device's controller initiates the retry operation with an initiation operation 302 to correct an error that it has detected. After initiation, control passes to a zone determination operation 304 wherein the zone containing the location of the error is determined. After the zone is determined, control passes to a retrieval operation 306 wherein the sequence for the zone determined in the zone determination operation 304 is retrieved. Control then passes to an index initialization operation 308. In the index initialization operation 308 an index is set. In the embodiment shown, an index variable n is set to one.

Control then passes to a retry procedure performance operation 310 that performs the retry procedure in the retrieved sequence in the position corresponding to the current value of the index variable n. In the embodiment shown, the retry procedures are read into fast memory upon device startup and need not be retrieved as they are already available to the method. In another embodiment, where the retry procedures are not read into fast memory at startup, the retry procedure performance operation 310 may also include the step of retrieving the retry procedure corresponding to the current value of the index variable n from its storage location. The retry procedure performance operation 310 performs each of the subprocedures (if any) in retry procedure n until the error is corrected or all the subprocedures are performed. If either of these two conditions are met, control passes to the query operation 312.

The query operation 312 determines if the error was successfully corrected. If the error was successfully corrected by retry procedure n, then control passes to a return operation 314 that returns control to the data storage device's controller and the device returns to normal operation.

If the error was not successfully corrected, the query operation 312 passes control to an increment index operation 316 that increments the index variable. In the example shown, the variable n is incremented by a value of 1, e.g. if the current value of n is 2 then it is incremented to be 3. After the index variable is incremented, control passes to a second query operation 318 that determines if all the retry procedures have been performed by checking if there is an n retry procedure. If there is not an n retry procedure, then all the retry procedures have been performed without correcting the error. In that case, control is passed to the hard error operation 320 that reports the hard error to the data storage device's controller and control subsequently passes to the return operation 314 and the device returns to normal operation as described above. If there is an n retry procedure, then control passes back to the retry procedure performance operation 310. Thus, the method 300 continues until a procedure corrects the error or all of the procedures are performed.

After the initial determination of the sequences during manufacture, the sequences are updated (re-optimized) periodically during normal drive operation. The updating procedure mirrors the procedure (described above) used in the manufacturing process. The entire data storage media is written to and/or read from and the number of successful retries are recorded by zone and procedure or, preferably, subprocedure. This information is then analyzed statistically by the data storage device and the retry procedures within each zone's sequence (or sequences, in embodiments utilizing separate write and read sequences) are reordered, if necessary.

In some embodiments of the present invention, the updating may only be performed during periods when the device is not in use or when user access time is not a concern. For example, in disc drive embodiments separate read sequences and combined read/write sequences may be updated during an idle period when the device performs an "Offline Auto Scan" or when the drive performs an automatic self-test. Often, disc drives will automatically go into an Offline Scan Mode when the drive has been offline for a predetermined period of time. Assuming that the drive is not interrupted by a user command during the process, an Offline Auto Scan is then performed which includes a complete read pass (i.e. reading all of the data storage media). Some embodiments of the present invention include, as an additional function of the Offline Auto Scan, updating the sequences using error data taken during the Offline Auto Scan's read pass.

In embodiments that utilize separate sequences for write retry operations, however, updating write sequences requires that the data storage media be write passed, that is completely written over with either '1's or '0's. As this will destroy any data on the device, updating separate write sequences is rarely performed. One instance where this may occur, again in disc drive embodiments, is when the Security Erase Unit command (standard ATA command code F4h) is performed. The command causes the entire disc to be write passed and all data replaced with '0's. In the embodiments, during the write pass all successful retry subprocedures are counted and recorded by zone. At the completion of the write pass, the retry procedures in the write sequences for the disc drive will be reordered, as necessary, based on the newly determined statistics.

Figure 4:
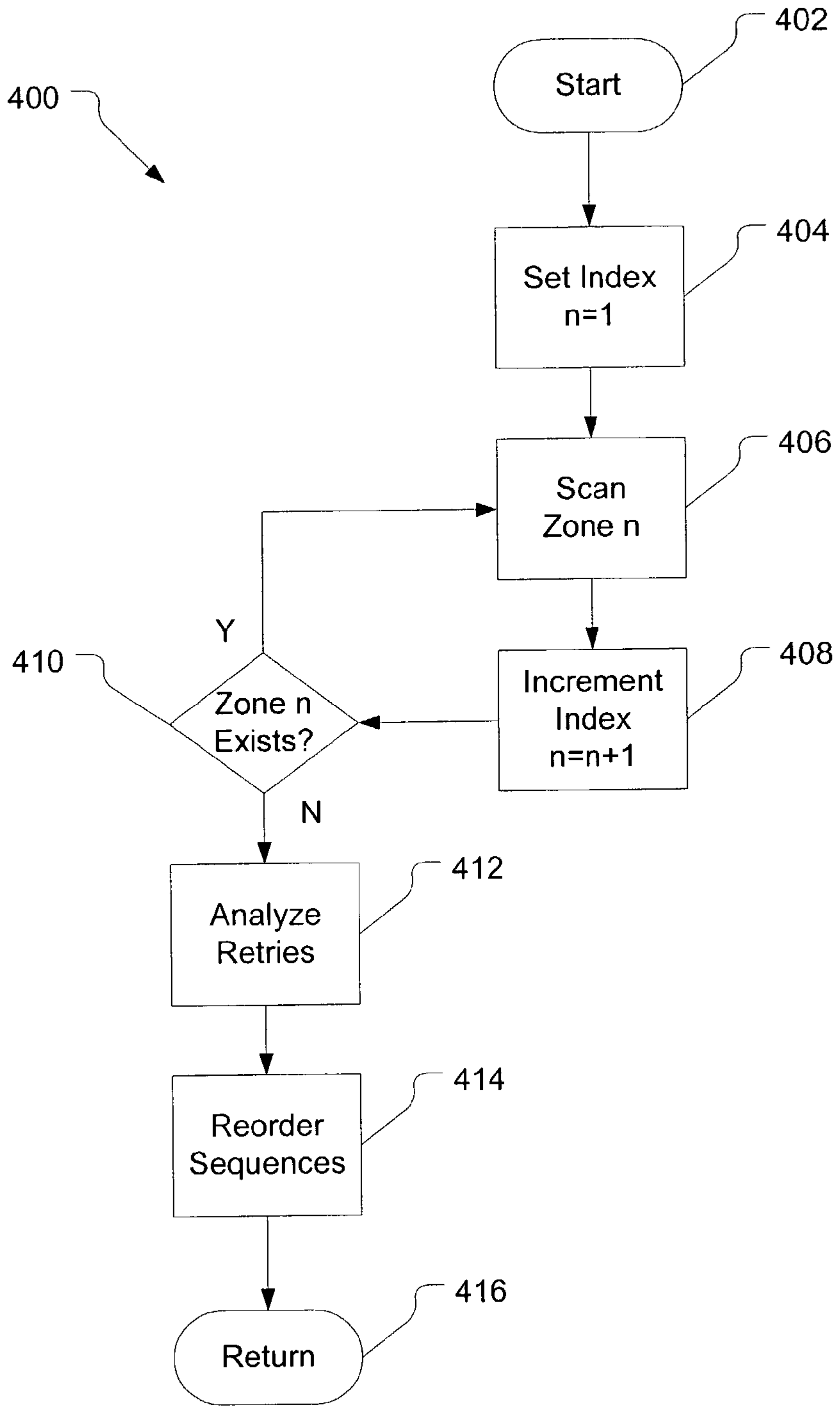
FIG. 4 is a flow chart of a method for determining a sequence of retry procedures in accordance with an embodiment of the present invention.

Turning now to FIG. 4, a flow chart of a method 400 for determining a sequence of retry procedures in accordance with an embodiment of the present is shown. The method 400 may be practiced during manufacture or periodically during operation to reorder the sequence of retry procedures in a retry operation.

The method starts with an initiation operation 402 when the data storage device's controller determines that it is time to update the sequence. This may occur automatically as part of a self-diagnostic performed by the data storage device during idle periods or it may occur as part of a user-initiated diagnostic procedure. After initiation, control passes to an index initialization operation 404. In an alternate embodiment, the initiation operation 402 occurs when the data storage device is powered up and immediately passes control to a query operation (not shown) that continuously monitors the drive for idle periods. In that embodiment, if the query operation determines that the device is idle, control is passed to the index initiation operation 404.

In the index initialization operation 404 an index is set. In the embodiment shown, an index variable n is set to one. Control then passes to a scan zone operation 406 wherein the zone corresponding to the index number (i.e. zone n) is scanned for errors. This scanning may be included in part of another diagnostic that requires the zone to be scanned or may be solely to generate the error information necessary to reorder the sequences. As a part of the scan zone operation 406 the number of successful retries by procedure is tracked for the zone. In one embodiment, this is done by incrementing a counter for each procedure or subprocedure for each time that procedure is successful. So that, at the end of the scan zone operation 406, the number of successful retries for each procedure is recorded for that zone. Other methods are possible, such as maintaining a relative success ranking for each procedure. Any method that allows the retry procedures to be sequenced by successfulness is applicable.

After the scan zone operation 406, control passes to an increment index operation 408 that increments the index variable. In the example shown, the variable n is incremented by a value of 1, e.g. if the current value of n is 2 then it is incremented to be 3. After the index variable is incremented, control passes to a query operation 410 that determines if all the zones have been scanned by checking if there is a zone for the incremented index value n. If there is a zone n, then control returns to the scan zone operation 406 and the zone is scanned as described above. Thus, the method 400 continues until all of the zones have been scanned.

If there is no zone n, then all the zones have been scanned. In that case, control is passed to the analysis operation 412. Analysis operation 412 analyzes the number of successful retries by retry procedure and zone and ranks the retry procedures by successfulness.

Once the retry procedure ranking has been developed for each zone, control passes to the reorder operation 414. The reorder operation 414 reorders each zone sequence to match the ranking developed by the analysis operation 412. In an embodiment, this performed by erasing the previous sequences and storing new sequences of retry procedure ID numbers corresponding to the ranking, from most successful to least. Once the new sequences are stored, control passes to a return operation 416 that returns control to the data storage device's controller and the device returns to normal operation.

EXAMPLE

A hypothetical example is provided showing the improvement in performance (i.e. reduction in total retry time)

resulting in a disc drive embodying the present invention. FIG. 5 presents a statistical breakdown of successful retry subprocedures in tabular format for a hypothetical disc drive not implementing the present invention. In the disc drive the exemplary retry procedures of FIG. 2*a* are performed in the sequence in which they appear in FIG. 2*a* for every location on the data storage disc in the disc drive. As described in FIG. 2*a*, retry procedures are presented in the first, or leftmost, column. The procedures are the same four exemplary procedures as shown in FIG. 2*a*. Each subprocedure is presented in the next column to the right. In the example shown, the sequence is dictated by the location on the table, i.e. the Off-track procedure is performed first, the VGA Gain is performed second, the FIR procedure is performed third and the MR Bias procedure is performed last.

The cumulative retry time by subprocedure is shown in the next column. Because the sequence follows the table order, with the topmost subprocedure being performed first, the cumulative retry time by subprocedure is determined by the location in the table and the time it takes to perform the earlier subprocedures in the sequence. For this hypothetical example, it is assumed that the time taken to perform each subprocedure is 1 ms. Thus, it would take 10 ms to correct an error using the $10^{th}$ subprocedure because the prior nine subprocedures must be performed before, the retry operation gets to the $10^{th}$ subprocedure.

The next column in the table in FIG. 5 shows a hypothetical count or number of successful retry subprocedures as would be determined by a scan operation. The number, for ease in comparison to later FIGS. , is presented by zone for a disc having five zones, even though the sequence is the same for each zone. For example, in zone 2 the scan successfully corrected 91 errors using the Set FIR ×8 retry subprocedure. Since a Set FIR ×8 subprocedure is sequentially the twelfth subprocedure, which means that each of the other subprocedures were performed without success prior to performing the FIR subprocedure.

The rightmost column shows the subtotal of time spent correcting errors by each subprocedure for the disc (i.e. sum of the total number of successful subprocedures over all zones multiplied by the retry time). For example, as it is assumed to take 1 ms to perform each subprocedure, then a subtotal of 4128 ms were spent correcting the 341 errors with the Set FIR ×8 (i.e. 40+91+42+90+81) subprocedure. Note, however, that had the Set FIR ×8 been the first subprocedure, only 341 ms would have been needed to perform the same number of corrections.

The total time spent by the retry operation correcting errors for the entire disc is shown below the subtotal time column and is a sum of the subtotal time for all retry subprocedures. In this hypothetical, the total time spent using the retry operation to correct the 3902 errors on the disc was 30376 ms.

FIGS. 6*a* though 6*e* are for the same disc drive with the same number and type of errors in the same locations on the disc, however now employing an embodiment of the present invention. FIGS. 6*a* though 6*e* together represent the retry operation for the disc drive. Each of FIGS. 6*a* though 6*e* shows the same information as shown in FIG. 5, but with the sequence of procedures optimized to reduce the total time required to correct all the errors occurring in a zone. The retry procedure is presented in the first column, the subprocedure in the second, the total time taken to perform a subprocedure based on its location in the sequence in the third and the subtotal time in the fourth column. In addition, FIG. 6*a* presents the optimum sequence for zone 1, FIG. 6*b* for zone 2, FIG. 6*c* for zone 3, FIG. 6*d* for zone 4, and FIG. 6*e* for zone 5. The optimum sequence for each zone is illustrated by the order in which the procedure appears in the table. For example, in FIG. 6*a* the optimum sequence is to perform the FIR procedure first, the Off-track procedure second, the VGA Gain procedure third and the MR Bias procedure last. This sequence is optimized in accordance with the present invention for zone 1 based on the distribution of successful retry procedures in the zone.

The number of successful retry subprocedures are presented again for each zone and are the same as that shown in FIG. 5, only the order of retry procedures has been changed. Thus, in FIG. 6*b* for zone 2 the same 91 errors successfully corrected using the Set FIR ×8 retry subprocedure appear.

The subtotal of time spent correcting errors by each subprocedure for each zone is shown in the last column in FIGS. 6*a* through 6*e*. Again the subtotal is sum of the total number of successful subprocedures over the zones multiplied by the retry time. The total time spent by the retry operation correcting errors for each zone is shown below the subtotal time column and is a sum of the subtotal time for all retry subprocedures. For example, FIG. 6*a* shows the total time the retry operation in accordance with the present invention spent correcting the errors in zone 1 to be 5212 ms.

FIG. 7 sums the total time spent performing retry operations in each zone to find a total time for the disc for a disc drive using an embodiment of the present invention. Each zone is presented in the first column and the total time spent performing retries for each zone, taken from FIGS. 6*a* through 6*e* is shown in the second column. Under the second column, the total time the retry operation in accordance with the present invention spent correcting the errors for the entire disc is shown as 25,296 ms. This is the sum of the total time spent performing retries for each zone after the sequence of retry procedures has been optimizes. Comparing this to the disc drive in FIG. 5 that required 30,376 ms to correct the same errors in the same locations, it can be seen that the disc drive in accordance with the present invention shown in FIGS. 06*a* though 6*e* and FIG. 7 reduces the total time spent performing retry operations by 5,080 ms and, thus, represents an almost 20% reduction in time spent performing retry operations.

The present invention provides a method (such as 300) for use in a data storage device (such as a disc drive 100) having data storage media (such as a data storage disc 108) wherein the data storage media is divided into a plurality of zones. The method (such as 300) reducing time the data storage device (such as 100) spends performing a retry operation (such as the retry operation represented by FIGS. 6*a* through 6*e*) including a plurality of retry procedures (such as 202). In the method, a sequence (such as 220) is defined for performing the plurality of retry procedures (such as 202) in each of the plurality of zones and stored or otherwise maintained on the data storage device. A command (such as 302) is received to perform the retry operation at an error location on the data storage media (such as 108) to correct an error at the error location. The zone associated with the error location is determined (in an operation such as 304) and the retry procedure sequence (such as 220) for the zone associated with the error location is retrieved (in an operation such as 306). The method (such as 300) performs (in an operation such as 310) the retry procedures (such as 202) in the retrieved sequence (such as 220) until either the error is corrected or the retry procedures in the retrieved sequence have been performed after with the method terminates (in an operation such as 314).

An embodiment of the method (such as 300) uses a separate read sequence (such as 220) for correcting read errors and a write sequence (such as 220) for correcting write errors. In the embodiment, the method includes retrieving the read sequence (such as 220) for the zone associated with the error location, if the error is a read error; and retrieving the write sequence (such as 220) for the zone associated with the error location, if the error is a write error. In he method, the read sequence comprises read retry procedures (such as 202) and the write sequence comprises write retry procedures (such as 202).

An embodiment of the method (such as 300) may perform the defining step (such as 400) during manufacture and the sequence (such as 220) for each zone may be optimized based on a probability of success for each retry procedure (such as 202) within that zone. The sequence (such as 220) for each zone may be periodically re-optimized during device (such as 100) operation. The retry procedures (such as 202) may include an off-track retry procedure (such as 204), an MR bias retry procedure (such as 210), a VGA Gain retry procedure (such as 206) and an FIR adaption retry procedure (such as 210) and each retry procedure (such as 202) may include a plurality of subprocedures (such as 212).

The present invention also provides a method (such as 400) for determining a sequence (such as 220) for performing a plurality of retry procedures (such as 202) during a retry operation (such as FIGS. 6*a* through 6*e*) in a data storage device (such as 100). The method comprises: dividing, during manufacture, the data storage media (such as 108) into a plurality of zones; scanning the data storage media in each zone for errors and performing the retry procedures to correct errors found in the scanning (in an operation such as 406); determining a sequence (in an operation such as 412 and 414) for performing the plurality of retry procedures for each of the plurality of zones, wherein the sequence for each zone is based on the number of errors corrected by each of the plurality of retry procedures (such as 202) in that zone; and storing (in an operation such as 414) the sequence (such as 220) for each of the plurality of zones in the data storage device. An embodiment of the method (such as 400) includes recording the number of errors corrected by each of the plurality of retry procedures (such as 202) for each of the plurality of zones.

An embodiment of the method (such as 400) uses one sequence (such as 220) for each to correct read errors and write errors in that zone. In another embodiment a read sequence (such as 220) is used to correct read errors.

In yet another embodiment of the method (such as 400), a read sequence is used to correct read errors and a write sequence is used to correct write errors. The method includes determining a read sequence (such as 220) for performing the plurality of read retry procedures (such as 202) for each of the plurality of zones and determining a write sequence (such as 220) for performing the plurality of write retry procedures (such as 202) for each of the plurality of zones.

The data storage media may be divided into a predetermined number of zones of a predetermined size or the may be divided by in to zones by scanning the entire data storage media (such as 108) for errors and performing the retry procedures to correct errors found in the scanning step (in an operation such as 406); determining a location on the data storage media for each of the errors corrected by the performing step; creating a distribution of error types and locations on the data storage media; analyzing the distribution; and dividing the data storage media into the plurality of zones based the results of the analyzing step.

The retry procedures used in the method (such as 400) may include an off-track retry procedure (such as 204), an MR bias retry procedure (such as 210), a VGA Gain retry procedure (such as 206) and an FIR adaption retry procedure (such as 210) and each retry procedure (such as 202) may include a plurality of subprocedures (such as 212). Embodiments of the method (such as 400) may be performed during manufacture and periodically performed during operation of the device, such as during idle periods.

A apparatus embodying the present invention may be a data storage device (such as 100) comprising: a data storage media (such as 108) divided into zones of data; a means for reading (such as 110) the data from the storage media; and a plurality of first sequences (such as 220) for performing a plurality of retry procedures (such as 202) to correct read errors, wherein each sequence (such as 220) is associated with one of the zones and is stored on the data storage device (such as 100) and wherein each first sequence (such as 220) is optimized during manufacture. Furthermore, the data storage device may periodically analyze the errors in each zone and re-optimize the first sequences (such as 220).

The data storage device (such as 100) may periodically reorder the sequences (such as 220) during device operation. The plurality of retry procedures may include an off-track retry procedure (such as 204), an MR bias retry procedure (such as 210), a VGA Gain retry procedure (such as 206) and an FIR adaption retry procedure (such as 210) and each retry procedure (such as 202) may include a plurality of subprocedures (such as 212).

An embodiment of the data storage device may include: a means for writing data to the data storage media (such as 110); and a plurality of second sequences (such as 220), each associated with one of the zones, for performing a plurality of write retry procedures (such as 202) for use by the writing means to correct write errors, wherein each second sequence is optimized during manufacture. The data storage device may periodically analyze the write errors in each zone and reorder the second sequence (such as 220).

The data storage device may be a disc drive utilizing magnetic data storage discs, an optical disc drive utilizing optical data storage discs, or utilize removable data storage media.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the invention could be easily modified to reorder the retry operations at the retry subprocedure level rather than the retry procedure level. Another variation is, rather than predetermining a fixed number of zones, determining the number and extent of zones based on a statistical analysis of the variation of successful retry procedures across the data storage media. Numerous other changes may be made which will readily suggest themselves to those skilled in the art and which are encompassed in the spirit of the invention disclosed and as defined in the appended claims.

What is claimed is:

1. A method comprising:

scanning the data storage media for errors;

determining a distribution of the errors on the data storage media dividing the data storage media into a plurality of zones based on the distribution of errors; and determining a retry sequence of procedures associated with each of the plurality of zones during idle operating periods of the data storage device.

2. A data storage device comprising:

A data storage medium having at least one zone; and

A plurality of retry procedures to correct errors, wherein specific retry procedures are associated with a specific zone and execution of such procedures are periodically reordered, during idle periods of the data storage device, based on errors found in its associated zone.

3. The data storage device of claim 2 wherein the plurality of retry procedures includes an off-track retry procedure, and MR bias retry procedure, a VGA Gain retry procedure and an FIR adaption retry procedure.

4. In a data storage device having data storage media divided into a plurality of zones, a method comprising:

maintaining a plurality of retry procedure sequences during idle periods of the data storage device, each sequence associated with one of the plurality of zones; wherein maintaining comprises:

scanning at least one zone for errors;

reordering the retry procedure sequence based on the errors in each sequences's associated zone.

5. The method of claim 4 wherein the plurality of retry procedures comprises an off-track retry procedure, an MR bias retry procedure, a VGA Gain retry procedure and an FIR adaption retry procedure.

* * * * *